United States Patent
Kasahara

[11] Patent Number: 5,486,974
[45] Date of Patent: Jan. 23, 1996

[54] ELECTROSTATIC ATTRACTION BOARD SYSTEM

[75] Inventor: Keiji Kasahara, Kakegawa, Japan

[73] Assignee: Abisare Co., Ltd., Shizuoka, Japan

[21] Appl. No.: 113,396

[22] Filed: Aug. 27, 1993

[30] Foreign Application Priority Data

Dec. 3, 1992 [JP] Japan ................................ 4-324307
Mar. 10, 1993 [JP] Japan ................................ 5-049611

[51] Int. Cl.⁶ .................................................. H02N 13/00
[52] U.S. Cl. ............................................................ 361/234
[58] Field of Search ........................................ 361/230, 233, 361/234; 279/128; 40/594, 124.1; 269/8

[56] References Cited

U.S. PATENT DOCUMENTS

| | | | |
|---|---|---|---|
| 3,359,469 | 12/1967 | Levy et al. | 361/234 |
| 3,448,356 | 6/1969 | Testone | 361/234 |
| 3,480,364 | 11/1969 | Barnett | 361/233 X |
| 3,634,740 | 1/1972 | Steuko | 361/234 |
| 3,916,270 | 10/1975 | Wachtler et al. | 361/234 |
| 4,480,284 | 10/1984 | Tojo et al. | 361/234 |
| 4,751,609 | 6/1988 | Kasahara | 361/234 |
| 4,766,515 | 8/1988 | Bollen et al. | 361/234 |
| 4,861,665 | 8/1989 | Kasahara | 428/411.1 |
| 4,975,802 | 12/1990 | Kasahara | 361/233 |
| 5,173,834 | 12/1992 | Sogoh | 361/234 |
| 5,229,910 | 7/1993 | Kasahara | 361/234 |

FOREIGN PATENT DOCUMENTS

| | | | |
|---|---|---|---|
| 61-152497 | 7/1986 | Japan . | |
| 2-304946 | 12/1990 | Japan | 279/128 |
| 3-227554 | 10/1991 | Japan | 279/128 |

*Primary Examiner*—A. D. Pellinen
*Assistant Examiner*—Fritz M. Fleming
*Attorney, Agent, or Firm*—Senniger, Powers, Leavitt & Roedel

[57] ABSTRACT

The object is to prevent the degradation of an attraction layer in an electrostatic attraction board system when objects are attracted for a long time. The electrostatic attraction board system comprises a coating layer disposed over the surface of the attraction layer formed of a layered dielectric substance and a pair of positive/negative comb-teeth like electrodes disposed in a laminating structure on the back face of the attraction layer. Objects such as paper sheets are attracted and held on the surface of the coating layer by coulomb force, The coating layer is formed of a plastic material such as biaxial drawn polyester having a low oxygen permeability and a low vapor permeability, and has a volume resistivity of $10^{10}$ Ωcm or more and thickness of 5 to 50μ.

12 Claims, 4 Drawing Sheets

ELECTROSTATIC ATTRACTION BOARD SYSTEM

BACKGROUND OF THE INVENTION (1) Technical Field

The present invention relates to an electrostatic attraction board system for attracting objects by coulomb force so as to be held thereon, and more particularly, an electrostatic attraction board system capable of preventing the degradation of its attraction layer.

(2) Prior Art

One known electrostatic attraction board system for attracting objects such as sheets by coulomb force so as to be held thereon comprises an attraction layer formed of a layered dielectric substance and a pair of electrodes electrically separated from each other and formed in a laminate structure on the back face side of the attraction layer. In this conventional electrostatic attraction board system, the pair of electrodes are connected to a d.c. power source, thereby utilizing coulomb force to attract and hold an object on the front face side of the attraction layer.

SUMMARY OF THE INVENTION

It has been proven that if such an electrostatic attraction board system is used with an object being attracted to the front face of the attraction layer for a long time (1 to 2 years), the attraction layer oxidizes, accelerating its degradation. The mechanism of the degradation will be explained below.

For example, when a d.c. voltage of 1 to 2 kV is applied to the electrodes formed in a laminate structure on the back face side of the attraction layer made of a dielectric substance, the applied d.c. voltage establishes an electric field that induces polarization charge on the attraction layer, so that electric charges opposite in polarity to the respective electrodes are induced at the back face of the attraction layer (i.e. the face on the side of the electrodes), whilst at the front face of the attraction layer are induced electric charges the polarities of which are the same as those of the respective electrodes. If an object such as a paper sheet or film is placed close to the front face of the attraction layer in the above condition, electric charges are induced at the face of the object on the side of the attraction layer, the electric charges being opposite in polarity to the electric charges which have been induced on the front face of the attraction layer. This allows the object to be attracted and held on the front face of the attraction layer by coulomb force.

In the condition where an object is attracted and held on the front face of the attraction layer as described above, the front face of the attraction layer oxidizes with oxygen since electric discharge is induced between the front face of the attraction layer and the surface of the object, and this oxidization is accelerated by increases in the conductivity of the front face of the attraction layer caused by the penetration of water. Therefore, if the electrostatic attraction board system is left in the above condition for a long time, the oxidization of the attraction layer increasingly proceeds causing damage to the attraction layer with the result that satisfactory attraction force cannot be obtained thereat.

In order to overcome the foregoing problem presented by the conventional system, the invention aims to provide an electrostatic attraction board system for attracting an object by coulomb force to be held thereon, the system being capable of advantageously preventing the degradation of the attraction layer caused by oxidation and ensuring satisfactory attraction force.

With the above-mentioned object in view, there is provided an electrostatic attraction board system according to the invention comprising:

(a) an attraction layer formed of a layered dielectric substance;

(b) a coating layer formed on a first face of the attraction layer so as to cover the first face, the coating layer having a small water permeability and oxygen barrier properties; and (c) at least a pair of electrodes formed on a second face of the attraction layer such that the electrodes are electrically separated from each other in a laminate structure for establishing an electric field in order to cause polarization charge at the attraction layer, wherein an object placed on the first face of the attraction layer with the coating layer interposed therebetween can be attracted and held by means of coulomb force.

Preferably, the attraction layer consists of one or more layers and is made of one kind of plastic or a mixed plastic material consisting of two or more plastics, such plastics being selected from polyester, polyvinyl chloride, acrylic, polycarbonate, polyacetal, phenol and epoxy. In particular, when the attraction layer consists of two or more layers, all the layers may be made of the same plastic (or mixed plastic material), or alternatively different plastics (or mixed plastic materials). Another alternative is that some layers may be made of the same plastic (or mixed plastic material) and others are different. It is possible to disperse one or more conductive materials selected from the following group into the above-mentioned one kind of plastic or two or more kinds of plastics (i.e., a mixed plastic material), the group including: carbon black; gold; silver; tin; zinc oxide; conductive oxides; and conductive ionic resins. The above conductive material(s) is formed into minute pieces when it is dispersed. The attraction layer preferably has a volume resistivity of $10^{11}$ to $10^{14}$ $\Omega$cm.

Similarly, it is preferable that the coating layer is made up of one or more layers and made of one kind of plastic or a mixed plastic material consisting of two or more plastics, such plastics being selected from: biaxial drawn polyester; nylon 6; acrylonitrile copolymer; vinylidene chloride methyl acrylate copolymer; polyvinyl chloride; polybutyleneterephthalate; ethylene-vinylalcohol copolymer; polyvinylidene chloride coated drawn polypropylene; polyvinylidene chloride coated drawn nylon; and polyvinylidene chloride coated polyester. Similarly, when the coating layer consists of two or more layers, all the layers may be made of the same plastic (or mixed plastic material) or alternatively, made of different plastics (or mixed plastic materials). Another alternative is that some layers may be made of the same plastic (mixed plastic material) whilst others are different. The coating layer preferably has a volume resistivity of $10^{10}$ $\Omega$cm or more and a thickness of 5 to 50$\mu$.

Preferably, there is provided an insulating layer on the back side of the pair of electrodes, the back side being opposite to the side directed to the attraction layer. In this case, it is preferable that the insulating layer is formed of an insulating adhesive and a coating layer for it has a volume resistivity of $10^{14}$ $\Omega$cm or more.

In such an electrostatic attraction board system, one face of the attraction layer is provided with the coating layer having a small water permeability and oxygen barrier properties, whereby even if the system is used for a long time with an object being attracted and held to the face of the attraction layer through the coating layer, the degradation of the attraction layer due to its oxidation can be prevented since the oxidation caused by oxygen present on the surface of the attraction layer and water penetration are prevented.

The coating layer according to the invention has a volume resistivity of $10^{10}$ Ωcm or more and a thickness of 5 to 50μ, so that even though such a coating layer is disposed on one face of the attraction layer, polarization charge is caused by an electric field macroscopically throughout the attraction layer and the coating layer, thereby exerting satisfactory attraction force on the object for holding it.

Other objects of the present invention will become apparent from the detailed description given hereinafter. However, it should be understood that the detailed description and specific examples, while indicating preferred embodiments of the invention, are given by way of illustration only, since various changes and modifications within the spirit and scope of the invention wall become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is an exploded perspective view;

FIG. 2 is a partial plan view;

FIG. 3 is a partial sectional view; and

FIG. 4 is a perspective view of an electrostatic attraction board system in use.

DESCRIPTION OF THE PREFERRED EMBODIMENT

Figure 1:
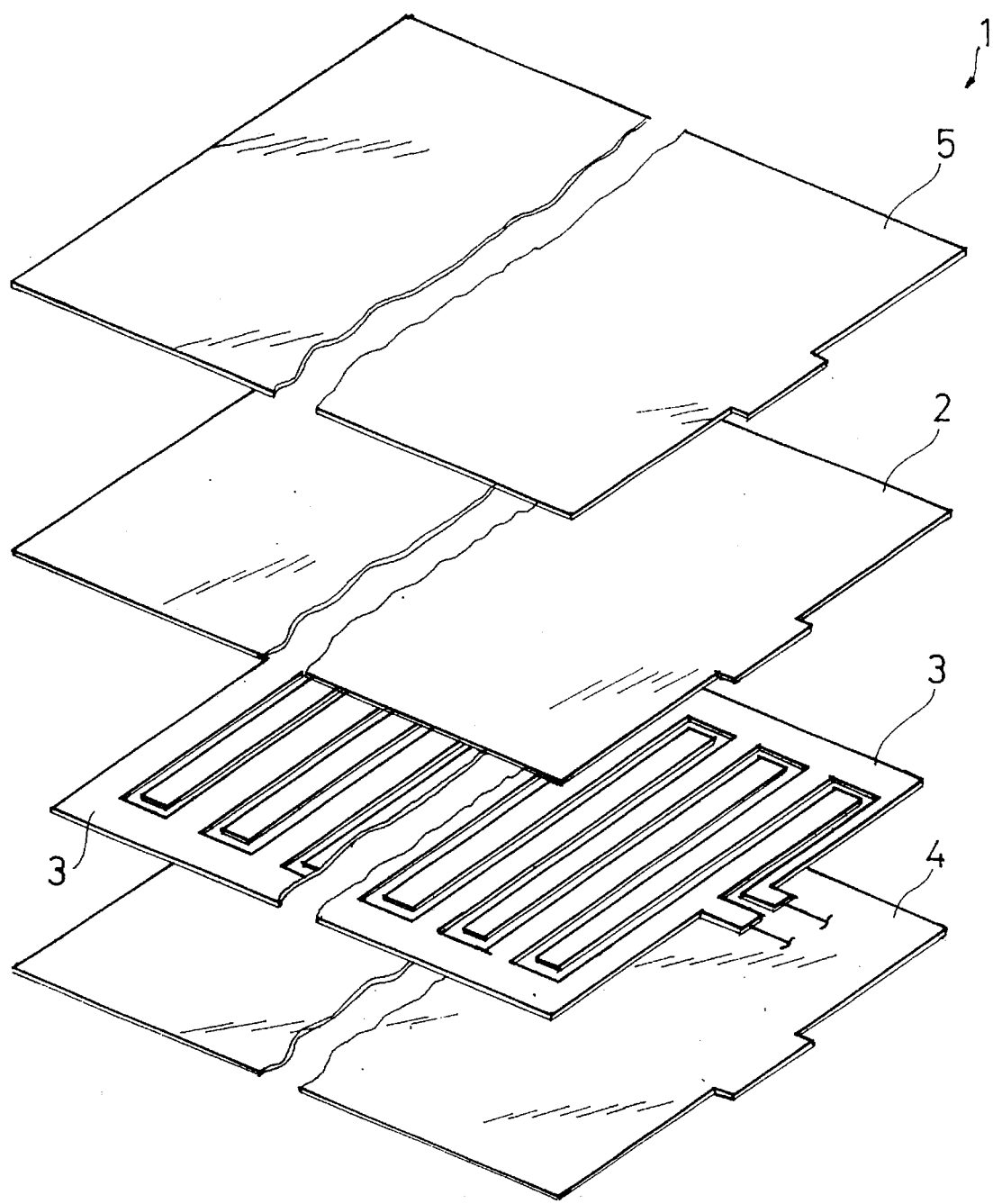
FIGS. 1 to 4 are for illustrating one embodiment of an electrostatic attraction board system according to the invention.

Referring now to the drawings, a preferred embodiment of an electrostatic attraction board system according to the invention will be explained.

Figure 2:
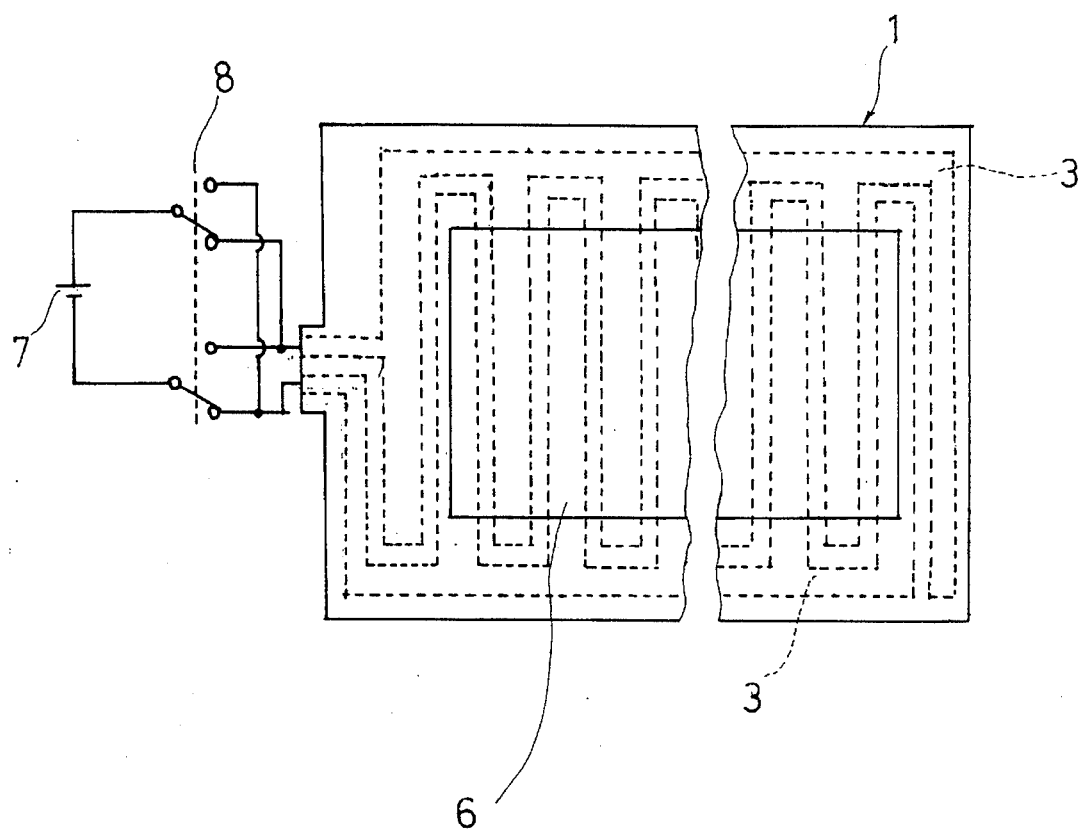
Figure 3:
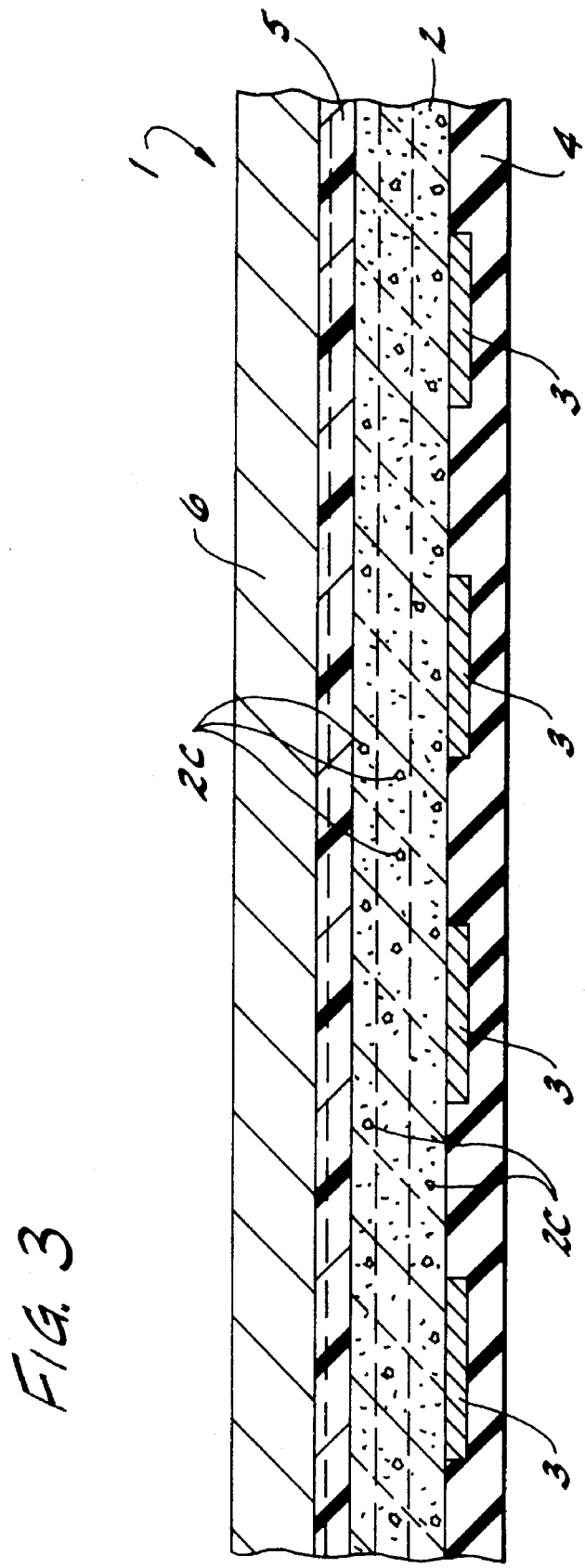
Figure 4:
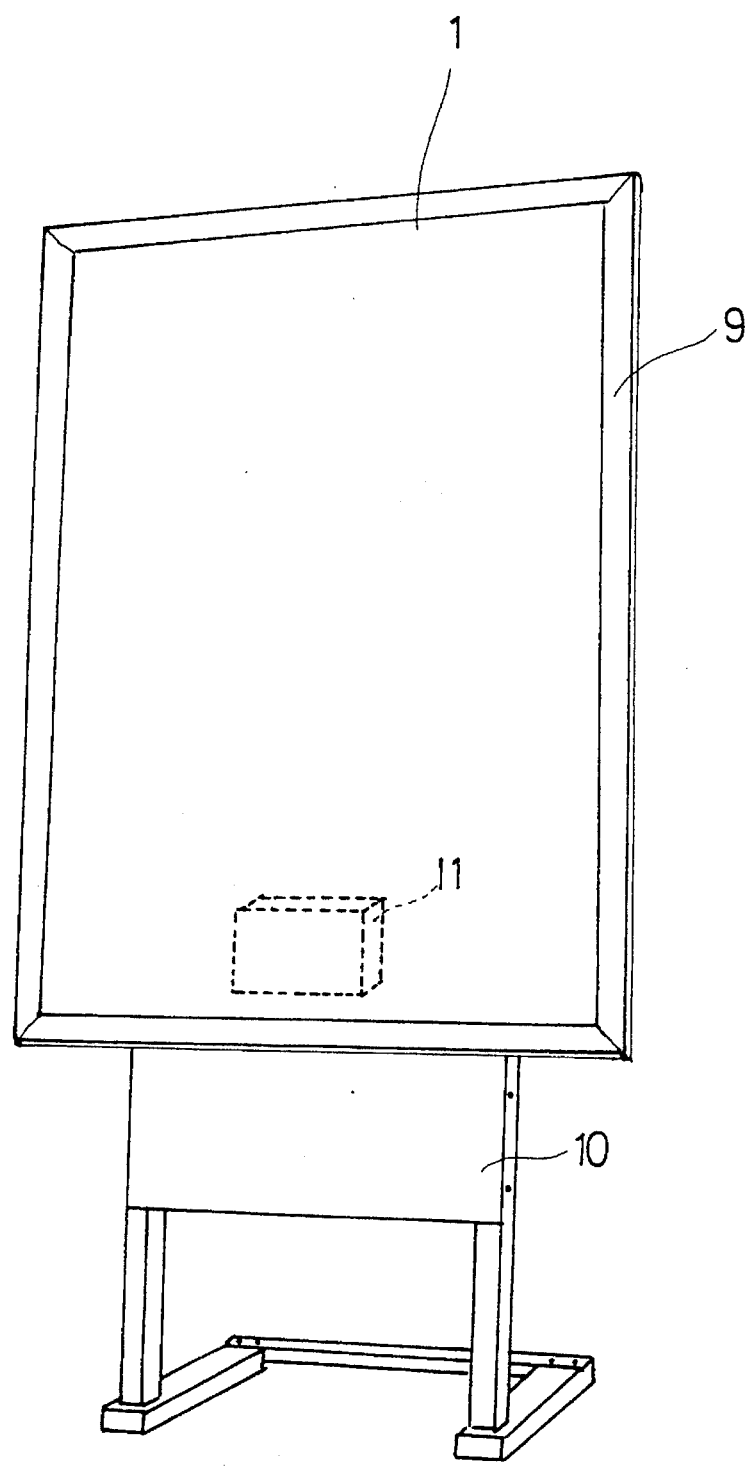

FIG. 1 shows an exploded perspective view of an electrostatic attraction board system according to one embodiment of the invention. FIGS. 2 and 3 show a partial plan view, and partial sectional view of the electrostatic attraction board system respectively, and FIG. 4 shows a perspective view of one example of the electrostatic attraction board system in use.

An electrostatic attraction board system 1 according to the embodiment comprises an attraction layer 2 consisting of a single layer, a pair of comb-teeth like electrodes 3 consisting of positive and negative electrodes formed in a laminate structure on the back face side of the attraction layer 2, and an insulating adhesive layer 4 disposed on one face side of the comb-teeth like electrodes 3, the face side being opposite to the face side directed to the attraction Layer 2. Disposed on the front face of the attraction layer 2 is a coating layer 5 consisting of a single layer, and an object 6 such as a paper sheet is held and attracted by coulomb force on the front face side of the attraction layer 2, with the coating layer 5 between.

The attraction layer 2 is made of a plastic material containing minute pieces of one or more conductive materials indicated by dots 2C dispersed therein, the plastic material being selected from polyester, polyvinyl chloride, acrylic, polycarbonate, polyacetal, phenol and epoxy. The dispersed conductive material(s) 2C is selected from the group including carbon black, gold, silver, tin, zinc oxide, conductive oxides and conductive ionic resins. The attraction layer 2 has a volume resistivity of about $10^{11}$ to $10^{14}$ Ωcm and a thickness of about 200 to 1,000μ.

The pair of comb-teeth like electrodes 3 are formed by screen printing using silver ink or conductive carbon ink, or alternatively by etching a copper foil and designed such that oppositely directed teeth portions are alternately arranged in a mating manner as shown in FIGS. 1 and 2. Each terminal is connected to a d.c. power source 7 of 2 kV through a selector switch 8. When the selector switch 8 is operated, the polarities of the pair of comb-teeth like electrodes 3 are changed. The selector switch 8 is operated when the object 6 is held by attraction for a long time and this operation prevents the occurrence of the "electret" phenomenon which causes a decrease in the attraction force. The adhesive layer 4 is formed of a high-insulating material of which volume resistivity is $10^{14}$ Ωcm or more.

The coating layer 5 is formed by applying a plastic material, of which oxygen permeability and vapor permeability are both low, to tile surface of the attraction layer 2 by coating or lamination, tile plastic material being selected from the group including: biaxial drawn polyester; nylon 6; acrylonitrile copolymer; vinylidene chloride methyl acrylate copolymer; polyvinyl chloride; polybutyleneterephthalate; ethylene-vinylalcohol copolymer (EVOH); polyvinylidene chloride (PVDC) coated drawn polypropylene; polyvinylidene chloride coated drawn nylon; and polyvinylidene chloride coated polyester. In this case, the volume resistivity of the coating layer 5 is $10^{10}$ Ωcm or more, preferably, in the range of $10^{10}$ to $10^{13}$ Ωcm and its thickness is 5 to 50μ. Table 1 shows the oxygen permeabilities and vapor permeabilities of various polymer films. In this table, the materials selected in the embodiment for forming the coating layer 5 are marked with "*".

TABLE 1

| material | oxygen permeability (cc · 25 μ/m², 24 h) | vapor permeability (g · 25 μ/m², 24 h) |
|---|---|---|
| | | measuring conditions: oxygen 25° C. DRY vapor 25° C. 90% |
| *PET (biaxial drawn polyester) | 45 | 5 |
| *nylon 6 | 18 | 40 |
| *acrylonitrile copolymer | 15 | 18 |
| *vinylidene chloride methyl acrylate copolymer | 3 | 0.4 |
| *PVC | 120 | 5 |
| *PBT | 128 | 36 |
| *EVOH (Trademark$_{EVAL\ F}$ of Kuraray Co., Ltd.) | 0.3 | 40 |
| LDPE | 7,000 | 2.5 |
| HDPE | 1,800 | 0.6 |
| PP | 2,500 | 1.7 |
| PS | 6,500 | 30 |
| poly4-methylpentene-1 | 60,000 | 55 |
| polybutadiene | 35,000 | 65 |
| PETG | 400 | 25 |
| PC | 3,600 | 40 |
| polytetrafluoroethylene | 7,500 | 1.0 |

TABLE 1-continued measuring conditions:
oxygen 25° C. DRY
vapor 25° C. 90%

| material | oxygen permeability (cc · 25 μ/m², 24 h) | vapor permeability (g · 25 μ/m², 24 h) |
|---|---|---|
| silicon elastomer | 1,500,000 | 800 |
| PVA | 0.06 | 1,000 |

The electrostatic attraction board system 1 having the above-described structure is fitted into a rectangular supporting frame 9 as shown in FIG. 4 with the adhesive layer 4 facing inwardly, and mounted together with the supporting frame 9 on a stand 10 or the like when it is used. The electrostatic attraction board system 1 may be fixed to or hung on a wall with the help of a mounting bracket or the like, instead of mounting it on the stand 10. The reference numeral 11 in FIG. 4 denotes a power unit that includes a power supply switch (not shown) and the selector switch 8.

In this embodiment, the front face of the attraction layer 2 is covered with the coating layer 5 formed of a plastic material having a low oxygen permeability and low vapor permeability, and therefore even if the electrostatic attraction board system is used with the object 6 being attracted to the front face of the attraction layer 2 for a long time, the degradation of the attraction layer 2 caused by oxidation can be prevented. Furthermore, since the coating layer 5 is formed of a thin film having a thickness of 5 to 50μ and the volume resistivity of the attraction layer 2 is $10^{11}$ to $10^{14}$ Ωcm, an electric field established by applying voltage to the electrodes 3 sufficiently induces polarization charge throughout the attraction layer 2 and the coating layer 5 from a microscopic point off view, so that the system 1 exerts satisfactory attraction force on the object 6. When the volume resistivity of the coating layer 5 is below $10^{10}$ Ωcm, the interior of the coating layer 5 becomes conductive, inducing no polarization charge. On the other hand, when the volume resistivity of the coating layer 5 exceeds $10^{13}$ Ωcm, a great "electret" phenomenon is caused in the coating layer 5, resulting in the loss of attraction force.

Although the thickness of the coating layer 5 is in the range of 5 to 50μ in the embodiment, the thickness is not necessarily limited to this range but could be varied in accordance with the thickness off tile attraction layer 2.

Although the volume resistivity of the coating layer 5 is $10^{10}$ to $10^{13}$ Ωcm in the embodiment, when a coating layer formed of a thin film of about 5 to 50μ in thickness is used, a satisfactory result can be obtained even if the volume resistivity of the coating layer is set to $10^{14}$ to $10^{17}$ Ωcm.

Further, the foregoing embodiment has been particularly described with the attraction layer 2 which consists of a single layer formed of one kind of plastic, but it is also possible to form the attraction layer 2 from a mixture of two or more kinds of plastics selected from the above-mentioned plastic group including polyester etc., and the attraction layer 2 could consist of two or more layers (as shown by the dashed lines in FIG. 3). Similarly, the coating layers 5 could be formed of a mixture of two or more kinds of plastics selected from the above-mentioned plastic group including biaxial drawn polyester etc., and could consist of two or more layers (as shown by the dashed lines in FIG. 3).

In the case where the attraction layer 2 and the coating layer 5 are respectively composed of two or more layers, all the layers constituting each layer 2 or 5 may be made of the same plastic or different plastics, or alternatively some layers may be made of the same plastic whilst others are different. Needless to say, "plastic" mentioned just above includes "a mixture of plastics".

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electrostatic attraction board system for use with a power source comprising:

(a) an attraction layer formed of a layered dielectric substance having a volume resistivity of $10^{11}$ to $10^{14}$ Ωcm;

(b) a coating layer formed on a first face of the attraction layer so as to cover the first face, the coating layer having a volume resistivity of $10^{10}$ to $10^{13}$ Ωcm, a thickness of 5 to 50μ a small vapor permeability and oxygen barrier properties; and (c) at least a pair of electrodes on a second face of the attraction layer such that the electrodes are electrically separated from each other in a laminate structure, said electrodes adapted to be connected to the power source for establishing an electric field in order to cause polarization charge at the attraction layer, said attraction layer, said coating layer and said electrodes forming a laminate structure;

wherein an object placed on the first face of the attraction layer with the coating layer interposed therebetween can be attracted and held by means of coulomb force resulting from the electric field.

2. The electrostatic attraction board system according to claim 1, wherein the attraction layer consists of one or more layers.

3. The electrostatic attraction board system according to claim 2, wherein when the attraction layer consists of a single layer, the attraction layer is formed of a plastic material.

4. The electrostatic attraction board system according to claim 2, wherein all the attraction layers are formed of a plastic material or different plastic materials, or some layers are a plastic material whilst others are different.

5. The electrostatic attraction board system according to claim 3, wherein the plastic material is one kind of plastic or a mixed plastic material consisting of two or more kinds of plastics, the plastic(s) being selected from the group including polyester, polyvinyl chloride, acrylic, polycarbonate, polyacetal, phenol and epoxy.

6. The electrostatic attraction board system according to claim 3 or 4, wherein the plastic material contains one or more conductive materials in minute pieces dispersed therein, the conductive material(s) being selected from the group including carbon black, gold, silver, tin, zinc oxide, conductive oxides, and conductive ionic resins.

7. The electrostatic attraction board system according to claim 1, wherein the coating layer consists of one or more layers.

8. The electrostatic attraction board system according to claim 7, wherein when the coating layer consists of a single layer, the coating layer is formed of a plastic material.

9. The electrostatic attraction board system according to claim 7, wherein when the coating layer consists of two or more layers, all the layers are formed of a plastic material or different plastic materials, or some layers are formed of a plastic material whilst others are different.

10. The electrostatic attraction board system according to claim 8 or 9, wherein the plastic material is one kind of plastic or a mixed plastic material consisting of two or more kinds of plastics, the plastic(s) being selected from the group including biaxial drawn polyester, nylon 6, acrylonitrile copolymer, vinylidene chloride methyl acrylate copolymer, polyvinyl chloride, polybutyleneterephthalate, ethylene-vinylalcohol copolymer, polyvinylidene chloride coated drawn polypropylene, polyvinylidene chloride coated drawn nylon, and polyvinylidene chloride coated polyester.

11. The electrostatic attraction board system according to claim 1, wherein there is provided an insulating layer disposed on one face side of the pair of electrodes, the face side being opposite to a face side directed to the attraction layer.

12. The electrostatic attraction board system according to claim 11, wherein the insulating layer is made up of an insulating adhesive.

\* \* \* \* \*